INVENTOR.
ALLEN R. LINDSAY
BY
Oberlin & Limbach
ATTORNEYS

Jan. 10, 1961     A. R. LINDSAY     2,967,813
AUTOMATIC MARKING DEVICE

Filed Aug. 29, 1958     3 Sheets-Sheet 2

INVENTOR.
ALLEN R. LINDSAY
BY
Oberlin & Limbach
ATTORNEYS

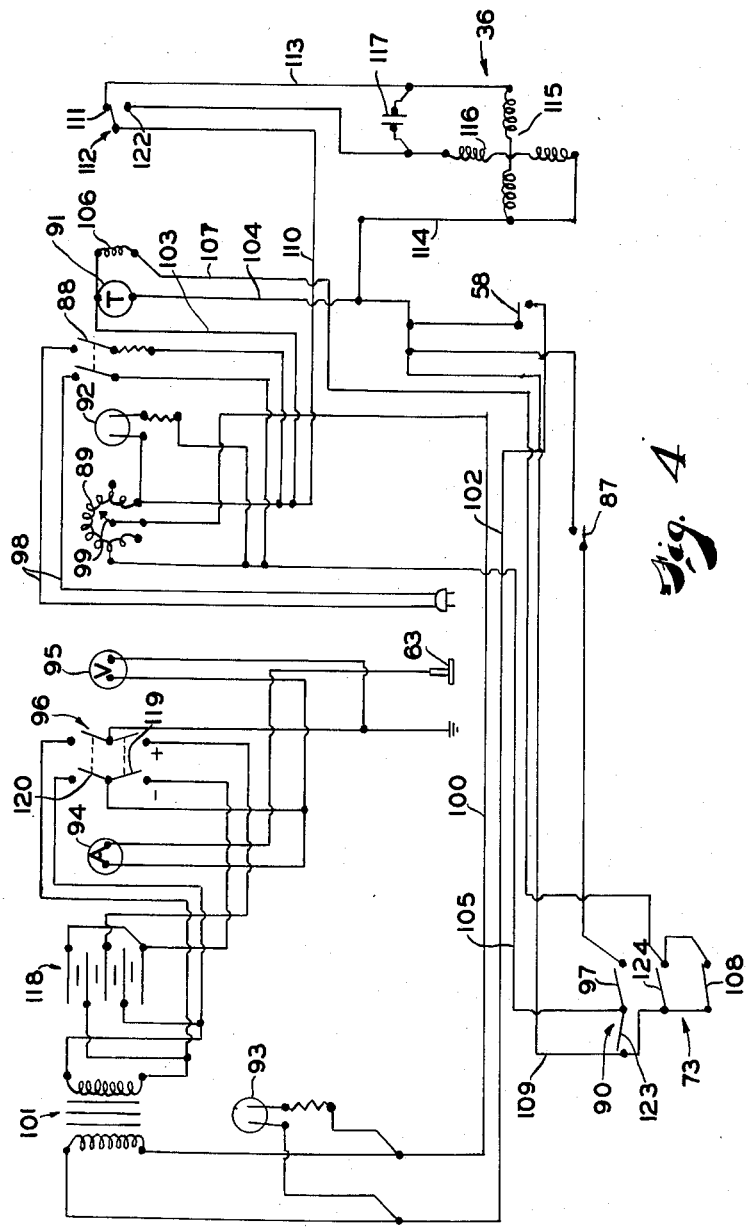

United States Patent Office 2,967,813
Patented Jan. 10, 1961

2,967,813
AUTOMATIC MARKING DEVICE

Allen R. Lindsay, Cleveland Heights, Ohio (% The Lectroetch Co., 14925 Elderwood Ave., East Cleveland 12, Ohio)

Filed Aug. 29, 1958, Ser. No. 757,985

15 Claims. (Cl. 204—224)

This invention relates to equipment for permanent electrolytic marking of metal and has for a primary object the provision of an instrument or device whereby such marking can be performed by an automatically controlled machine operation.

Electrolytic marking devices available heretofore have uniformly been of a manually-operated type, with some form or another of cartridge or pad requiring to be grasped by an operator and applied by hand to the metal surface to be marked. The process inherently involves electric current flow, so that certain electrical controls must be manipulated, and since the operator also determines by hand the pressure with which the marking device is engaged with the workpiece, special training is required before he becomes sufficiently skilled uniformly to produce clearly etched legends of the desired depth.

The superiority of electrolytic marking over other much less durable means for coding or identifying metal parts is becoming more widely appreciated, but the time and labor involved in the hand operation of previously available equipment seriously limit the feasibility of the process for use in and as a part of production of finished articles at reasonably high rates. There has thus been a real need in the art for a practical marking device so constructed and operative as to reduce materially the time for individual marking of the workpieces, the labor required and, by such improvements, the cost of the operation. This need has been met by the automatic marker of the invention which, moreover, substantially eliminates the need for special skills on the part of the operator.

Another object of the invention is to provide such an automatic marking device in which not only the time cycle and voltage can be adjusted in accordance with the job requirements, but the pressure contact of the marker with the work can be varied over a very wide range. With any given pressure setting, the engagement of the workpieces fed to the device is uniform and completely independent of operator judgment.

It is another object of the invention to provide an automatic marking device which, by simple adjustment thereof, can accommodate workpieces of substantially different size.

A further object is to provide an automatically controlled electrolytic marking device in which the active element is brought into firm contact with the work before the current is applied, thereby to preclude blurring of the etched marks which could result with premature current flow.

It is also an object to provide a marking device wherein the work-contacting element is adjustably reciprocated in accordance with an automatically controlled cycle of operation and by drive mechanism which is both economical and reliable over long periods of use.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 4 is a wiring diagram of the electrical system used to control both the mechanical and the electrolytic etching operations of the marker.

Figure 1:
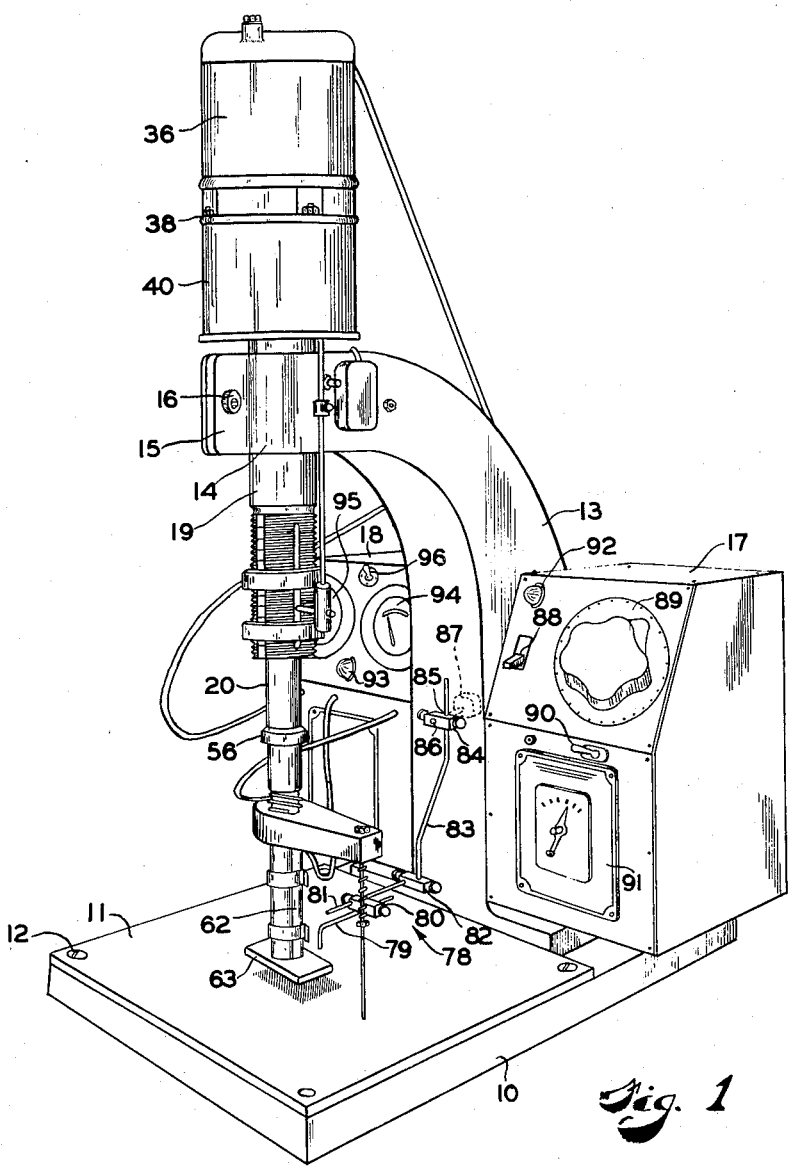
Fig. 1 is a perspective view of a marking device made in accordance with the present invention.

Referring now to the drawings in detail, the illustrated embodiment of the invention is portable and in the nature of a bench fixture comprising a rectangular base 10 having a wear plate 11 removably fastened by screws 12 against its upper surface, such plate being as wide as the base and extending from the front edge over the major portion of the distance from the same to the rear edge. A support arm 13 is fastened to the base behind the wear plate and extends first centrally upwardly and then, through a curved section, forwardly so that its free end is positioned approximately above the center of the wear plate, on which the work will be supported. This end of the arm is bifurcated or split into two vertical sections having opposed half-round portions 14 and forwardly contiguous, parallel terminal portions 15. The latter are drawn together by an adjusting screw 16 threaded transversely through the same. Control cases 17 and 18 are mounted respectively at the sides of the support arm to house and support the various electrical controls and instruments to be described. To enhance portability of the unit, the base, support arm, and control cases are preferably made of aluminum, with the arm, moreover, being fabricated and hollow over its major extent.

The opposed rounded end portions 14 of the support arm embrace a hollow main shaft 19 and hold the same with its axis vertical by tightening of the adjusting screw 16 firmly to grip such shaft. It will be apparent that the screw can be loosened to move the shaft up and down relative to the arm and thus vary the distance between the lower end of the shaft and the wear plate, the shaft again being clamped to any such other adjusted position. An operating shaft 20 is reciprocable within the stationary main shaft 19 and extends from the lower end of the latter, a sleeve bearing 21 being provided between the two at such end and another similar bearing 22 disposed in like manner at an upwardly spaced region. The upper end of the operating shaft is tapped as shown at 23 to receive a drive screw nut 24 and a drive screw 25 is threaded through the same, a reduced bore 26 extending downwardly from the tapped recess 23 to accommodate projection of the screw through the nut. A set screw 27 is threaded in the shaft 20 and enters a slot in the outer or upper end of the nut 24 to lock the same.

The drive screw 25 has an upper enlarged and unthreaded section 28, and a ball bearing assembly 29 is fitted thereon against a flange formed at the lower end of this section. At its outer periphery, the ball bearing is supported on a small shoulder formed in the inner surface of the stationary shaft 19, and an inverted cup 30 is threaded into the end of such shaft against the top of the bearing 29 at its peripheral portion. A nut 31 is threaded on the drive screw 25 above such bearing into engagement with the same to act as a further retainer therefor.

Figure 2:
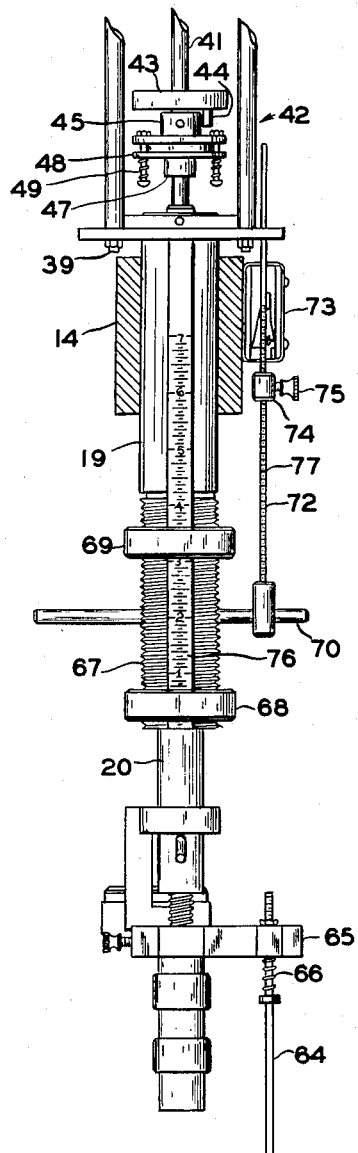
Fig. 2 is a fragmentary front elevation of the mechanical operating assembly of such device.
Figure 3:
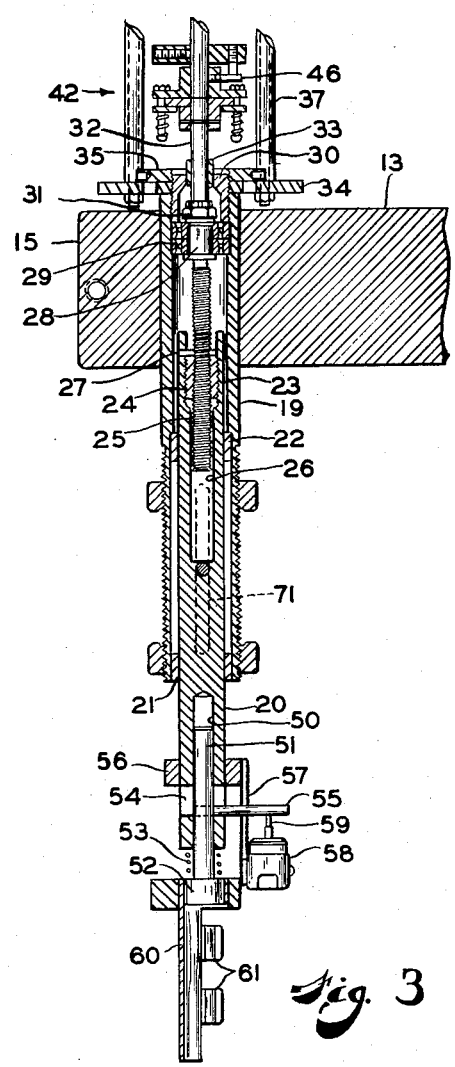
Fig. 3 is a longitudinal section of the assembly illustrated in Fig. 2, at right angles to the plane of section of such other figure.

The drive screw has an unthreaded upper extension 32 passed through a bushing 33 supported axially in the closed end of the cup 30, and it will be seen that this cup likewise projects beyond the upper end of the main shaft 19. An annular mounting plate 34 is threaded on such projecting end portion of the cup and is held tightly against the end face of the main shaft 19 by a lock nut 35. A capacitor type electric motor 36, vertically oriented, is supported in spaced relation on the mounting plate by means of four spacer sleeves 37 between the motor flange 38 and the plate 35 and through bolts 39 enclosed by such sleeves. As shown in Fig. 1, the space between the motor and mounting plate is normally enclosed by a casing 40 which has been removed in Figs. 2 and 3.

The drive shaft 41 of the motor thus projects downwardly for in-line coupling to the drive screw 25 through a clutch in such space and designated generally by reference numeral 42. This clutch comprises a driver collar 43 fixed on the motor shaft 41 and carrying a downwardly projecting pin 44. A motor clutch plate 45 is rotatably mounted on the shaft 41 and has a radially projecting pin 46 which, for a purpose to be more fully described hereinbelow, projects into the travel path of the vertical pin 44 on the driver collar 43 upon rotation of the latter by the motor. A drive clutch plate 47 is affixed on the upper end of the drive screw extension 32, and a further clutch plate 48 is disposed beneath such drive clutch plate 47 and connected to the upper motor plate 45 outwardly about the periphery of the upper end flange of the plate 47 by mounting spring and screw assemblies 49. Suitable gaskets are interposed between the opposed faces of plates 45 and 47 and the opposed surfaces of plates 47 and 48.

This assembly will thus be seen to constitute a slip clutch, and the capacitor motor is reversible. It will further be apparent that the motor clutch plate 45 is actually driven by engagement of the pin 44 on the driving collar 43 with the clutch plate pin 46 and, accordingly, when the motor direction is reversed substantially a complete revolution must be made before such drive collar pin is moved around to engage the clutch pin to drive the latter in the opposite direction. The reason for provision of this lost-motion in reversal of the drive will be explained later in connection with operation of the marker.

Accordingly, the motor 36 is effective to reciprocate the operating shaft 20 perpendicularly toward and away from the wear plate of the device. The lower end of such shaft also has a bore 50 and a plunger 51 is reciprocable therein. The lower end of the plunger is enlarged, as shown at 52, and a spring 53 is interposed between the bottom of the operating shaft 20 and such enlarged lower end of the plunger. Vertically extending, diametrically opposite slots 54 intersect the bore 50 of the shaft and a rod 55 is passed through the telescoped portion of the plunger to project into one or both of such slots, thereby to provide limited relative movement between the plunger and the shaft 20.

A grip collar 56 is secured about shaft 20 and supports a depending bracket 57 at the lower end of which there is mounted a microswitch 58 having its stem 59 extending vertically in the path of the rod 55 for engagement and actuation thereby. The lower end 52 of the plunger 51 mounts a depending cartridge bracket 60 of approximately semi-circular section and two vertically spaced spring clips 61 are carried by such bracket releasably to hold therein an electrolytic cartridge marker of commercially available type. Such marker may, for example, be of the construction disclosed in my Patent No. 2,798,849, and it is sufficient here to note that such implement used comprises a barrel 62 releasably mounted in the bracket 60 and a head 63 for engagement with the work to be marked. It will of course be understood that this marker contains a suitable electrolyte, a dielectric stencil of the mark to be etched, and an electrode for connection to one side of the potential source.

The metal work will normally be at ground potential and will of course be in contact with the wear plate 11, so that the latter may be appropriately grounded. I have shown in the illustrated embodiment an optional grounding contact 64 supported by an arm 65 made of insulating material projecting laterally from the end of the plunger 51. This contact rod is resiliently connected to such arm by a spring 66, so that it will be forced firmly against the workpiece for good electrical contact with the same.

The lower end portion of the main shaft 19 is externally threaded as shown at 67, and stop collars 68 and 69 are adjustable thereon. Such collars are provided to determine the effective stroke of the operating shaft 20 cooperably with a cross pin 70 extending through the shaft and through vertically elongated slots 71 in the surrounding threaded portion of the main shaft. For a purpose to be described, a control rod 72 extends vertically from such cross shaft adjacent to a microswitch 73 mounted at the same side of the support arm 13 and a control collar 74 is adjustably positionable along the length of the control rod, such collar being held by a screw 75 in its selected positions of adjustment. Appropriate scale markings 76 are applied at the front of the threaded main shaft portion to indicate the settings of the upper and lower stop collars, and a scale 77 is also provided on control rod 72 for positioning of the collar 74 thereon.

Considering now the mechanical operation of this feed assembly, it will be seen that the motor 36 is effective through the pin engagement of the driving collar 43 and the motor clutch plate 45 of the slip clutch 42 to actuate the drive or feed screw 25 to extend or lower the operating shaft 20. This advance is transmitted to the cartridge-holding plunger 51 through the spring 53, but the rod 55 connected to such plunger is not immediately depressed in view of the clearance provided by the slot 54 beneath the adjustable grip collar 56. Shaft 20 moves downwardly until cross pin 70 carried thereby strikes the lower stop collar 68 whereby the feed motion is arrested, the slip clutch preventing damage to the motor drive connection and the motor stalling. Near the end of this stroke, the marking head 63 will have been brought into contact with the work supported on the wear plate 11 and the positioning of the lower stop collar is such that spring 53 will be compressed as a result of continued short advance after contact is made with the work. Grip collar 56 is positioned to limit the relative upward movement of the plunger such that switch 58 is not actuated until the marking head is moved and held firmly by the spring pressure against the work.

This switch is used to connect the cartridge to the potential source, whereby pressure contact with the workpiece is ensured before current can flow. Furthermore, it will be seen that adjustment of the lower stop collar varies the spring pressure effective to establish the work contact, these two characteristics being important advantages of the present invention.

Thus, it is possible to provide optimum contact for the electrolytic process in accordance with the size and other features of the work and the type of etched mark to be produced therein. The range of available contact pressure is not only considerable, but different ranges can be provided readily by substituting springs of appropriately varying strength.

The current will be applied for the length of time suitable for etching the work to the desired depth and, at the end of such time, the direction of motor rotation is reversed. The described pin connection to the clutch permits the motor to start in the opposite direction without load on the same, whereby the stall condition is readily broken. Moreover, the almost full revolution without load enables the motor to come up to speed and acquire momentum before the clutch is again actuated to drive the mechanism, now to retract or lift the operating shaft. The extent to which the shaft is thus lifted is determined by the position of the upper stop collar 69, with the motor again being stalled when the cross pin 70 is arrested thereby. The two stop collars thus determine the limits of the operating shaft stroke.

The foregoing constitutes essentially a complete operating cycle which can be non-repetitive until further actuation or automatically repeating. The upper microswitch 73 is provided for the latter type of operation to reverse the motor when the top limit of the stroke is reached, both the trip collar 74 on the control rod 72 of course positioned to actuate the same at this point in the cycle. The unit shown is intended for hand feeding operation, wherein the operator places the workpiece on the wear plate, and provision is made for initiating the cycle in response to such placement of the work. This automatic start means comprises a control rod assembly, designated generally by reference numeral 78 in Fig. 1, which includes an L-shaped rod 79 extending generally horizontally in a fore and aft direction behind the marking head 63 with its shorter section projecting downwardly at such spacing behind the cartridge as to be engaged by the workpiece inserted thereunder on the wear plate 11. Such rod is adjustably connected by a clamp 80 to an extension rod 81 having another clamp 82 near its rear end, and an offset rod 83 extends vertically from the latter clamp to a switch actuating clamp 84 closely adjacent the front face of the support arm 13 at an opening 85 in the same. An actuating shaft 86 extends horizontally from the clamp 84 through the opening 85 to the interior of the arm 13 where a suitable start switch 87 is located. This assembly of rods is rockable in the support arm opening, so that when the work engages and pushes the same to the rear the assembly moves to actuate the switch 87. It will further be seen that the lower or substantially horizonal rods are readily adjustable to position the forward foot variably with respect to the marking head, thereby to accommodate workpieces which vary substantially in size.

In addition to the control elements already named, the unit comprises, in the right hand control case 17, as used in Fig. 1, a main on-off switch 88, a variable autotransformer 89 to regulate the voltage used in the electrolytic etching operation, a selector switch 90 to provide manual or automatic operation as above indicated, and a timer 91 adjustable to determine the duration of the operating cycle. An off-on signal light 92 is also mounted on this control case and, mounted by other control case 18, there are an indicating lamp 93 for the etching circuit, an ammeter 94, a voltmeter 95, and a voltmeter control switch 96, the latter having alternating current and direct current positions.

In Fig. 4, I have shown a complete wiring diagram for the new marker to show the manner in which these and the earlier-noted control elements are connected and operative. It will be assumed that the operator has made all of the mechanical adjustments appropriate for the particular work to be etched and has thus positioned the upper collar 69 and the lower collar 68 to their adjusted positions on the scale 76, the latter determining the spring pressure, that the proper voltage has been selected as indicated by the scale of the autotransformer 89 and that the timer 91 has been set for the desired operating cycle.

If the operation is to be semi-automatic, the switch 90 is moved to the so marked position to close the contacts 97 thereof shown in the wiring diagram. The main switch 88 is then closed to energize the unit, the power cord 98 being of course connected to an available source of supply. Signal light 92 is illuminated to show the power on condition, and the primary circuit of the autotransformer 89 will be energized both in obvious manner. The secondary tap 99 of such transformer is connected by a wire 100 to one end of the primary of a step-down transformer 101 having an isolated secondary in the etching circuit, but such primary is not now energized, since its other end is connected by wire 102 to switch 58 which is open with the feed column in its elevated start condition.

The operator inserts a workpiece to close switch 87 whereby the timer is energized by a circuit including wire 103 extending to the same from one side of the source, a wire 104 extending from the timer to the now closed switch 87, the closed contacts 97 of the manual-automatic switch 90, and wire 105 connecting the latter to the other side of the source. Similarly the magnetic clutch 106 of the timer, which is conventional, is energized by connection from one side of the timer through wire 107, normally closed contacts 108 of reversing microswitch 73, and wire 109 to the closed switch 87, and from the same to the other side of the source similarly as the timer.

At the same time, the motor 36 is energized by a circuit including wire 110 from one side of the source, normally closed contacts 111 of a timer operated switch 112, wire 113, wire 114, and the previously described return through the switch 87. Both coils 115 and 116 of the motor are energized, with a phase difference therebetween provided by a capacitor 117 connected across ends of the same in the usual manner of a capacitor type motor, and in the condition described the motor is driven in a direction to lower or advance the feed mechanism in the manner aforesaid.

After the marking head has thus been fed a predetermined distance, with some compression of the spring caused by engagement with the work, the switch 58 is actuated by the feed assembly to close the same, whereby the circuit for energization of the transformer 101 is completed, this condition being indicated by illumination of signal light 93. The secondary of this transformer is connected to a conventional selenium rectifier 118 and the direct current voltage from the latter is applied through contacts 119 of the voltmeter switch 96 to the marking head. In this position, the ammeter 94 is connected of course in series in the etching circuit and the voltmeter indicates the direct current output. By moving the switch 96 to the alternating current voltage position, to close contacts 120 thereof, the circuit to the head is interrupted and the voltmeter is connected across the secondary of the transformer 101 for checking purposes. The ground lead 121 is connected to the wear plate on which the work rests or optionally to the grounding contact 64 which may be provided.

The timer 91 now runs for the predetermined interval and at the expiration thereof, operates switch 112 to open contacts 111 and close contacts 122. It will be seen that this action reverses the phase relationship in the motor windings, whereby the motor 36 is now driven in the opposite direction of rotation and, after the lost-motion described earlier, the motor is thus effective to elevate the feed mechanism and marking head. The switch 58 almost immediately opens to interrupt the etching circuit, and the timer continues to run with its clutch still energized until the feed mechanism has been raised to the upper stall position determined by the upper collar 69.

The work is now removed, whereupon the switch 87 opens to de-energize the timer and clutch and the motor. The timer has a spring resetting action, whereby it is returned to its normal start position, wherein timer-operated switch 112 moves to open contacts 122 and close contacts 111. The unit is thus in condition for a subsequent cycle initiated by insertion of another workpiece and will otherwise be non-repeating.

For fully automatic operation, the switch 90 is moved to automatic position to close contacts 123 and open contacts 97 thereof. The control collar 74 for reversing switch 73 is also adjustably positioned to actuate this switch when the feed mechanism is elevated. Contacts 108 of this switch are open, and contacts 124 closed, the latter providing the energization of the timer clutch 106. It will be seen that this switch actuation promptly starts the cycle, since the work-engaged switch 87 is now by-passed and the circuits for the timer 91 and motor 36 completed through contacts 123. The application of working voltage to the marking head will be controlled by the switch 58 as before and the mechanism will advance, hold for the predetermined marking interval, and then be reversed similarly as set forth above.

When the feed mechanism is now elevated to its adjusted upper position, the resetting of the timer will re-establish the normal closure of timer operated switch contacts 111 and, the motor circuit remaining closed, a further reversal will automatically follow to start the feed mechanism downward in another cycle. In this case, then, the workpiece actuation is effectively by-passed, and the operator simply inserts and removes workpieces with the unit running continuously.

In accordance with the foregoing, it will be seen that the term "manual" as used to describe one form of operation concerns only the start of the operating cycle to distinguish between some initiating action for each cycle and a fully automatic continuous recycling, the cycle itself being carried out in each case without hand manipulation. Furthermore, so-called "manual" operation is preferably responsive to hand feed of the work, but could as well involve actual hand switching, e.g. by removing the lower part of the control rod assembly 78 whereby the operator would initiate a cycle by depressing or rocking the vertical rod 83 thereof with his hand.

The timer control utilized also lends itself to synchronous feed arrangements, particularly since the device is capable of continuous recycling for any desired period of time. For example, it would be a relatively simple matter to provide a turret adapted to move, by indexing, a plurality of pieces successively into position for marking thereof with any suitable means used for loading and unloading the turret or the like. Likewise, a magazine feed can be used, with individual synchronous feeding past the working area of the marking head, such an arrangement being particularly suited for etching small pieces, for example, metal washers.

Such instances demonstrate the extreme versatility of the new unit and in all cases, the electrolytic process is carried out with uniform precision and efficiency.

Other modes of applying the principle of the invention may be employed, change being made as regards the details described, provided the features stated in any of the following claims or the equivalent of such be employed.

I, therefore, particularly point out and distinctly claim as my invention:

1. An automatic marking device for the electrolytic marking of metals, comprising a work-contacting head including an electrode and dielectric stencil means, support means for said head, a surface adapted to position the work to be marked for engagement by the head, drive means operative to reciprocate said support means and hence the work-contacting head relative to such surface, electric circuit means for controlling such operation of the drive means in accordance with a predetermined timed cycle of actuation thereof, further circuit means for applying current to the electrode means of the work-contacting head, and means for energizing said further circuit means thus to apply current to the electrode means in response to engagement of the work by said head.

2. An automatic marking device for the electrolytic marking of metals, comprising a work-contacting head including an electrode and dielectric stencil means, support means for said head, a surface adapted to position the work to be marked for engagement by the head, drive means operative to reciprocate said support means and hence the work-contacting head relative to such surface, electric circuit means for controlling such operation of the drive means in accordance with a predetermined timed cycle of actuation thereof, further circuit means for applying current to the electrode means of the work-contacting head, and means for controlling energization of said further circuit means in response to movement of the support means, said last-named means being operative to energize the further circuit means thus to apply current to the electrode means when the head is advanced sufficiently to contact the work to be marked.

3. The combination set forth in claim 2 characterized further in that said last-named means is adjustable to vary the point in the advance of the head at which the further circuit means is energized.

4. An automatic marking device for the electrolytic marking of metals, comprising a work-contacting head including an electrode and dielectric stencil means, resiliently deformable mounting means for said head, a surface adapted to position the work to be marked for engagement by the head, drive means operative to advance and retract said mounting means and hence the head relative to such surface, such advance by the drive means continuing beyond the point at which the head contacts the work thereby to deform said resiliently deformable means to provide predetermined contact pressure to the electrode means of the work-contacting head, and control means for energizing said circuit means after pressure contact with the work has been made.

5. The combination set forth in claim 4 characterized further in that the drive means is adjustable to vary the deformation of the resiliently deformable means and thereby provide different degrees of pressure contact with the work.

6. An automatic marking device for the electrolytic marking of metals, comprising a work-contacting head including an electrode and dielectric stencil means, resiliently deformable mounting means for said head, a surface adapted to position the work to be marked for engagement by the head, drive means operative to advance and retract said mounting means and hence the head relative to such surface, such advance by the drive means continuing beyond the point at which the head contacts the work thereby to deform said resiliently deformable means to provide predetermined contact pressure, electric circuit means for controlling such operation of the drive means in accordance with a predetermined timed cycle of actuation thereof, further circuit means for applying current to the electrode means of the work-contacting head, and control means for energizing said further circuit means in response to advance movement of the drive means sufficient to cause the work-contacting head to be pressed firmly against the work.

7. An automatic marking device, comprising a work-contacting marking head, support means for said head mounting the same for limited relative movement, resiliently deformable means between said head and support means to resist such relative movement, a surface adapted to position the work to be marked for engagement by the head, reversible drive means for advancing and retracting said support means relative to such surface, timer means for controlling operation of said drive means in accordance with a predetermined cycle of actuation, and means for adjusting the stroke of said drive means, the advance of the head thereby being sufficient to continue a predetermined adjusted degree beyond the point of work engagement by the head to deform said resiliently deformable means and thus provide a predetermined pressure contact with the work.

8. An automatic marking device for the electrolytic marking of metals, comprising a work-contacting head including an electrode and dielectric stencil means, support means for said head mounting the same for limited relative movement, resiliently deformable means between said head and support means to resist such relative movement, a surface adapted to position the work to be marked for engagement by the head, reversible drive means for advancing and retracting said support means relative to such surface, timer means for controlling operation of said drive means in accordance with a predetermined cycle of actuation, means for adjusting the stroke of said drive means, the advance of the head thereby being sufficient to continue a predetermined adjusted degree beyond the point of work engagement by the head to deform said resiliently deformable means and thus provide a predetermined pressure contact with the work, circuit means for energizing the electrode means of said head, and switch means actuated in response to movement of the head into pressure engagement with the work to render said circuit means thus effective to energize the electrode means.

9. An automatic marking device, comprising a work-contacting marking head, support means for said head mounting the same for limited relative movement, resiliently deformable means between said head and support means to resist such relative movement, a surface adapted to position the work to be marked for engagement by the head, drive means for advancing and retracting said support means relative to such surface, a reversible electric motor, slip clutch means connecting said motor and drive means, electric circuit means for controlling such operation of the drive means in accordance with a predetermined timed cycle of actuation thereof, and means for adjusting the stroke of said drive means, the advance of the head thereby being sufficient to continue a predetermined adjusted degree beyond the point of work engagement by the head to deform said resiliently deformable means and thus provide a predetermined pressure contact with the work.

10. The combination set forth in claim 9 characterized further in that the connection of said motor and clutch means provides rotary lost motion, whereby the motor upon reversal of its direction of rotation is free to start in the new direction without load thereon.

11. An automatic marking device for the electrolytic marking of metals, comprising a work-contacting head including an electrode and dielectric stencil means, support means for said head mounting the same for limited relative movement, resiliently deformable means between said head and support means to resist such relative movement, a surface adapted to position the work to be marked for engagement by the head, drive means for advancing and retracting said support means relative to such surface, a reversible electric motor, slip clutch means connecting said motor and drive means, electric circuit means for controlling such operation of the drive means in accordance with a predetermined timed cycle of actuation thereof, means for adjusting the stroke of said drive means, the advance of the head thereby being sufficient to continue a predetermined adjusted degree beyond the point of work engagement by the head to deform said resiliently deformable means and thus provide a predetermined pressure contact with the work, circuit means for energizing the electrode means of said head, and switch means actuated in response to movement of the head into pressure engagement with the work to render said circuit means thus effective to energize the electrode means.

12. The combination set forth in claim 11 characterized further in that the connection of said motor and clutch means provides rotary lost motion, whereby the motor upon reversal of its direction of rotation is free to start in the new direction without load on the same.

13. An automatic marking device, comprising a base having a workpiece-supporting surface, a feed assembly arranged to extend substantially vertically above such surface and adapted to mount a marking head at its lower end, reversible drive means for reciprocating said feed assembly to advance such head downwardly into engagement with a workpiece on such surface and to retract the same to an elevated position, electric circuit means for controlling said drive means operative when energized to cause the same thus to advance and retract the feed assembly, and means for energizing said circuit means to initiate such operation in response to placement of a workpiece in position for marking beneath the elevated feed assembly.

14. An automatic marking device, comprising a base having a workpiece-supporting surface, a feed assembly arranged to extend substantially vertically above such surface and adapted to mount a marking head at its lower end, reversible drive means for reciprocating said feed assembly to advance such head downwardly into engagement with a workpiece on such surface and to retract the same to an elevated position, timer control means for said drive means operative to cause the same to advance the feed assembly and after a predetermined time to reverse the drive means to retract the assembly to its such elevated condition, such movement of the feed assembly forming an operating cycle of the device, and means responsive to return of the feed assembly to the elevated position thereof to initiate a succeeding cycle of such time controlled operation of the drive means.

15. An automatic marking device for the electrolytic marking of metals, comprising a work-contacting head including an electrode and dielectric stencil means, support means for said head, a surface adapted to position the work to be marked for engagement by the head, reversible drive means for reciprocating said support means to advance the head into engagement with the workpiece on said surface and to retract the same, electric circuit means for controlling said drive means operative when energized to cause the same thus to advance and retract the head, means for energizing said circuit means to initiate such operation in response to placement of a workpiece on said surface in position for marking, further circuit means for applying current to the electrode means of the work-contacting head, and means for energizing said further circuit means thus to apply current to the electrode means in response to engagement of the workpiece by said head.

References Cited in the file of this patent

UNITED STATES PATENTS

| | | |
|---|---|---|
| 1,854,763 | Richards | Apr. 19, 1932 |
| 2,098,813 | Rossean | Nov. 9, 1937 |
| 2,385,198 | Engle | Sept. 18, 1945 |
| 2,398,590 | Mitchell | Apr. 16, 1946 |
| 2,463,711 | Nagle | Mar. 8, 1949 |
| 2,532,908 | Hangosky et al. | Dec. 5, 1950 |
| 2,797,193 | Eigler et al. | June 25, 1957 |

FOREIGN PATENTS

| | | |
|---|---|---|
| 934,620 | Germany | Sept. 29, 1955 |
| 662,161 | Germany | June 9, 1938 |